Dec. 30, 1930.  C. FISHER  1,786,838
PARACHUTE
Filed July 24, 1928

INVENTOR.
CHARLES FISHER.
BY Munn+Co.
ATTORNEYS.

UNITED STATES PATENT OFFICE

CHARLES FISHER, OF SAN FRANCISCO, CALIFORNIA

PARACHUTE

Application filed July 24, 1928. Serial No. 295,053.

My invention relates to improvements in parachutes, and it consists in the combinations, constructions, and arrangements hereinafter described and claimed.

An object of my invention is to provide a parachute which is constructed of a cloth that has heavy threads woven into it, these threads extending at right angles to each other and forming squares. Should the fabric within any one of these squares become torn or mutilated from any reason, the heavy threads would confine this tear to the small square in which it originated. This would prevent the entire parachute from ripping, and, of course, would provide a parachute which is much stronger than the standard one now manufactured.

Other objects and advantages will appear in the following specification, and the novel features of the device will be particularly pointed out in the appended claims.

Figure 1:
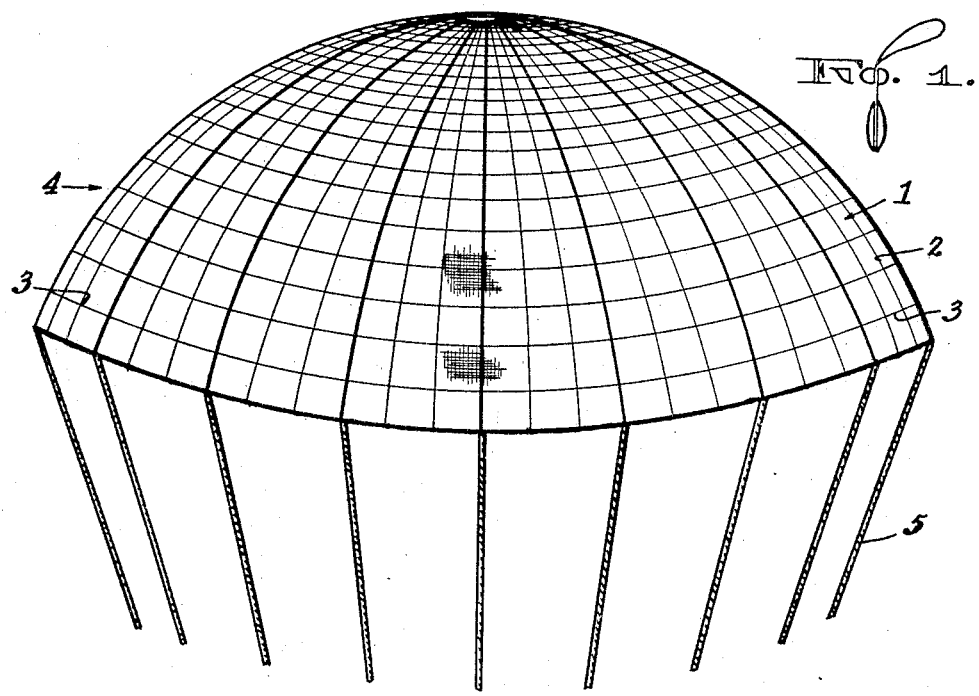
Figure 2:
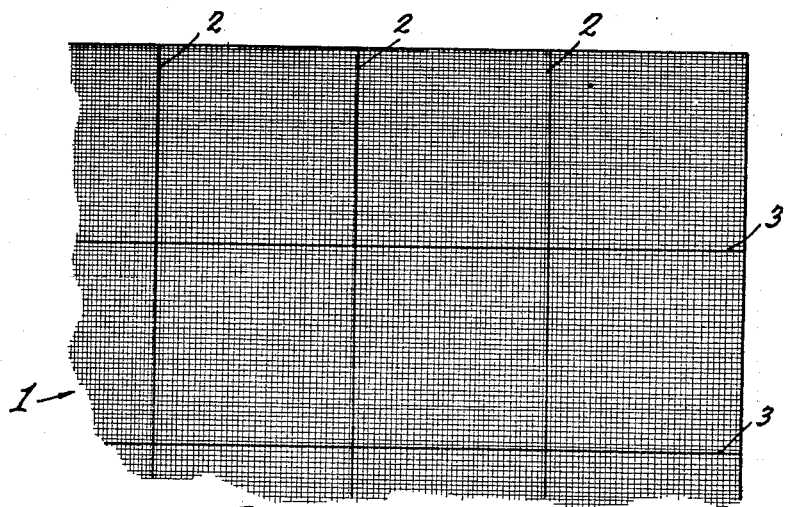

My invention is illustrated in the accompanying drawing forming a part of this application, in which Figure 1 is a perspective view of a parachute made from the reinforced cloth; and Figure 2 is a plan view of a portion of the cloth.

In carrying out my invention, I provide a piece of cloth 1, which has woven into the warp and woof of the fabric, heavy threads 2 and 3. These threads may be spaced from each other at any desired distance, but they are preferably positioned close enough to form small squares.

In order that the parachute may function properly the cloth must have an appreciable or prescribed porosity. The cloth is of the type that may be known as closely woven, this distinguishing from some very loosely woven fabrics, for example, netting.

Figure 2 illustrates the disposition of the reinforcing threads. These threads assume a substantially radial and concentric relationship in the cloth which, for this purpose, is cut into triangular pieces or segments and connected.

The cloth thus formed is fashioned into a parachute 4 indicated generally in Figure 1. Strands 5, or other suitable supporting means, extend from the cloth 1 and are used for supporting the person (not shown).

The advantages of a parachute constructed along these lines will readily be seen. In the first place, it confines to a very small area any weakness of the fabric caused by a defective weave, a dropped stitch or a cut thread. It further confines to a very small area any subsequent perforation of the fabric that may be caused by the parachute coming into contact with the air craft should the aviator not clear the ship in time. The same is true should the parachute strike some obstacle in its downward descent, such as a cliff, tree, or the like.

In case the parachute is perforated by a bullet, the tear would not extend throughout the entire cloth, but would be confined to the small square in which it occurred. By using the heavy reinforcing threads in the manner indicated, the device is considerably strengthened without adding any perceptible weight. In fact, the parachute could be made of a lighter weave if desired, thus using less silk and lightening the weight without sacrificing strength. This, of course, cuts down the cost. It should be further noted that the heavy strands act as bracing for the cloth in much the same manner as the struts act as bracings in building construction. This added degree of firmness and rigidity to the parachute should inspire more confidence in the use of it. Confidence in a hazardous undertaking of this kind is of inestimable value.

The disposing of the heavy threads at right angles to each other prevents longitudinal and vertical splitting of the fabric. It is obvious, however, that heavy threads could form diamond-shaped areas, or areas having a different configuration without departing from the spirit and scope of my invention. It should also be noted that the heavy threads provide a stronger attachment for the segmental ropes 5 than is usually provided in the standard parachute.

Although I have shown and described one embodiment of my invention, it is to be understood that the same is susceptible of various changes, and I reserve the right to employ such changes as may come within the scope of the appended claims.

I claim:

1. A single ply of fabric fashioned into parachute formation, said fabric having reinforcing threads woven thereinto both radially and concentrically of a central point.

2. A parachute comprising a plurality of supporting ropes, and a sustaining cloth consisting of a single ply of fabric having reinforcing threads woven thereinto concentrically of a central point and reinforcing threads extending radially of said point, certain ones of which coincide with the places of attachment of said ropes to the cloth.

3. A single ply of fabric fashioned into parachute formation, said fabric having reinforcing threads formed therein and disposed substantially radially and concentrically of a central point.

4. A single ply of fabric fashioned into parachute formation, said fabric being composed of segments each having reinforcing warp and woof threads, said segments being connected to dispose the reinforcing threads in substantially radial and concentric relationship to the center of the parachute fabric.

CHARLES FISHER.